(12) United States Patent
Ishitoya

(10) Patent No.: US 10,837,856 B2
(45) Date of Patent: Nov. 17, 2020

(54) DYNAMIC BALANCE TESTING DEVICE

(71) Applicant: KOKUSAI KEISOKUKI KABUSHIKI KAISHA, Tama-shi, Tokyo (JP)

(72) Inventor: Satoshi Ishitoya, Kanagawa (JP)

(73) Assignee: KOKUSAI KEISOKUKI KABUSHIKI KAISHA, Tokyo (JP)

( * ) Notice: Subject to any disclaimer, the term of this patent is extended or adjusted under 35 U.S.C. 154(b) by 45 days.

(21) Appl. No.: 16/243,502

(22) Filed: Jan. 9, 2019

(65) Prior Publication Data

US 2019/0145845 A1 May 16, 2019

Related U.S. Application Data

(63) Continuation-in-part of application No. PCT/JP2016/073523, filed on Aug. 10, 2016.

(51) Int. Cl.
*G01M 1/22* (2006.01)
*G01M 1/16* (2006.01)

(52) U.S. Cl.
CPC ............... *G01M 1/22* (2013.01); *G01M 1/16* (2013.01)

(58) Field of Classification Search
CPC .................................. G01M 1/16; G01M 1/22
See application file for complete search history.

(56) References Cited

U.S. PATENT DOCUMENTS 3,805,623 A * 4/1974 Seghesio ............... G01M 1/225
                                                73/459
3,902,373 A * 9/1975 Reutlinger ............. G01M 1/22
                                                73/462
(Continued)

FOREIGN PATENT DOCUMENTS

EP       2891873 A1    7/2015
JP     H02-020135 U    2/1990
(Continued)

OTHER PUBLICATIONS

Feb. 14, 2019 International Preliminary Report on Patentability issued in International Patent Application No. PCT/JP2016/073523.
(Continued)

*Primary Examiner* — Natalie Huls
(74) *Attorney, Agent, or Firm* — Oliff PLC

(57) ABSTRACT

A dynamic balance testing device includes a vibrating unit configured to rotatably hold a predetermined rotating body being a specimen, a first spring configured to elastically support the vibrating unit and restrict displacement of the vibrating unit in a direction parallel to a rotation axis of the predetermined rotating body, and at least three second springs configured to elastically support the vibrating unit and restrict displacement of the vibrating unit in a predetermined direction orthogonal to the rotation axis. The at least three second springs are attached to the vibrating unit on a same predetermined plane, and the vibrating unit holds the predetermined rotating body such that a projection of a center of gravity of the predetermined rotating body onto the predetermined plane is substantially at the same position as a position where the first spring is attached to the vibrating unit.

12 Claims, 11 Drawing Sheets

(56) References Cited

U.S. PATENT DOCUMENTS

| | | | | | |
|---|---|---|---|---|---|
| 4,004,464 | A | * | 1/1977 | Himmler | G01H 1/003 73/462 |
| 4,532,803 | A | * | 8/1985 | Woolley | G01M 1/16 73/471 |
| 4,608,867 | A | * | 9/1986 | Iliev | G01M 1/32 73/462 |
| 5,307,279 | A | * | 4/1994 | Christian | G01M 1/22 701/124 |
| 5,421,199 | A | * | 6/1995 | Himmler | G01M 1/00 700/279 |
| 5,469,741 | A | * | 11/1995 | Scourtes | G01M 1/22 73/462 |
| 5,600,062 | A | * | 2/1997 | Moench | G01L 1/22 73/462 |
| 6,415,661 | B1 | * | 7/2002 | Wiese | G01M 1/22 73/462 |
| 8,347,712 | B2 | * | 1/2013 | Buzzi | G01M 1/045 73/459 |
| 2003/0213302 | A1 | * | 11/2003 | Miura | G01M 1/20 73/462 |
| 2013/0186170 | A1 | * | 7/2013 | Trukenmueller | G01M 1/02 73/1.14 |
| 2014/0224013 | A1 | * | 8/2014 | Rogalla | G01M 1/22 73/462 |
| 2015/0013453 | A1 | * | 1/2015 | Lawson | G01M 1/045 73/462 |
| 2019/0285502 | A1 | * | 9/2019 | Kajikawa | G01M 1/16 |
| 2020/0025651 | A1 | * | 1/2020 | Tsumura | B60C 19/00 |

FOREIGN PATENT DOCUMENTS

| | | |
|---|---|---|
| JP | H05-017636 Y2 | 5/1993 |
| JP | H11-295178 A | 10/1999 |
| JP | 2010-190350 A | 9/2010 |
| JP | 5426991 B2 | 2/2014 |
| JP | 2014-048091 A | 3/2014 |
| JP | 5622171 B2 | 11/2014 |

OTHER PUBLICATIONS

Nov. 1, 2016 International Search Report issued in International Application No. PCT/JP2016/073523.

Aug. 11, 2020 Notice of Reasons of Refusal issued in Japanese Patent Application No. 2019-158959.

* cited by examiner

DYNAMIC BALANCE TESTING DEVICE

CROSS-REFERENCE TO RELATED APPLICATION

This is a Continuation-in-Part of International Application No. PCT/JP2016/073523 filed on Aug. 10, 2016. The entire disclosures of the prior application is incorporated herein by reference.

TECHNICAL FIELD

The present disclosure relates to dynamic balance testing devices.

BACKGROUND

A dynamic balance testing device has been known that is configured to measure dynamic balance of a specimen by rotatably holding a rotating body, being a specimen, on a vibrating table vibratably supported on a mount, making the rotating body to rotate, and measuring vibration occurring to the vibrating table due to dynamic imbalance of the rotating body while the rotating body is rotating.

A conventionally-known dynamic balance testing device has a configuration in which a substantially rectangular flat-plate-shaped base of the vibrating table is vibratably coupled to the mount by hanging the base by attaching the base to a vertical spring at a substantially central portion in a width direction of an upper end of the base and further supporting the base by attaching portions near four corners of the rectangular shape to horizontal springs.

Another conventionally-known dynamic balance testing device has a configuration in which the specimen is held by an air bearing.

Still another conventionally-known dynamic balance testing device is provided with a nozzle for blowing compressed air to rotationally drive the rotating body and is configured such that a blowing height and a blowing direction of the nozzle with respect to the rotating body can be adjusted.

SUMMARY

Measurement sensitivity of the dynamic balance testing device becomes higher as a difference value obtained by subtracting a displacement of an upper face side (lower face side) of the base due to a predetermined imbalance amount of the rotating body at its lower face side (upper face side) from a displacement of the upper face side (lower face side) of the base due to the predetermined imbalance amount of the rotating body at its upper face side (lower face side) gets larger. However, since, in the conventionally-known dynamic balance testing device, the position where the vertical spring is attached to the base is largely deviated from a point being a projection of a center of gravity of the rotating body onto the base, the displacement of the upper face side (lower face side) of the base becomes larger not only by the imbalance of the rotating body at its upper face side (lower face side) but also by the imbalance of the rotating body at its lower face side (upper face side). As a result, the difference value obtained by subtracting the displacement of the upper face side (lower face side) of the base due to the predetermined imbalance amount of the rotating body at its lower face side (upper face side) from the displacement of the upper face side (lower face side) of the base due to the predetermined imbalance amount of the rotating body at its upper face side (lower face side) gets smaller. Therefore, the position where the vertical spring is attached to the base in the conventionally-known dynamic balance testing device has been causing the measurement sensitivity of the dynamic balance testing device to degrade.

Aspects of the present disclosure are advantageous to provide one or more improved techniques that provide a dynamic balance testing device with high measurement sensitivity.

According to aspects of the present disclosure, there is provided a dynamic balance testing device which includes a vibrating unit configured to rotatably hold a predetermined rotating body being a specimen, a first spring configured to elastically support the vibrating unit and restrict displacement of the vibrating unit in a direction parallel to a rotation axis of the predetermined rotating body, and at least three second springs configured to elastically support the vibrating unit and restrict displacement of the vibrating unit in a predetermined direction orthogonal to the rotation axis. The at least three second springs are attached to the vibrating unit on a same predetermined plane, and the vibrating unit holds the predetermined rotating body such that a projection of a center of gravity of the predetermined rotating body onto the predetermined plane is substantially at the same position as a position where the first spring is attached to the vibrating unit.

DETAILED DESCRIPTION OF EMBODIMENTS

Hereinafter, an embodiment of the present disclosure will be described with reference to the drawings.

Figure 1:
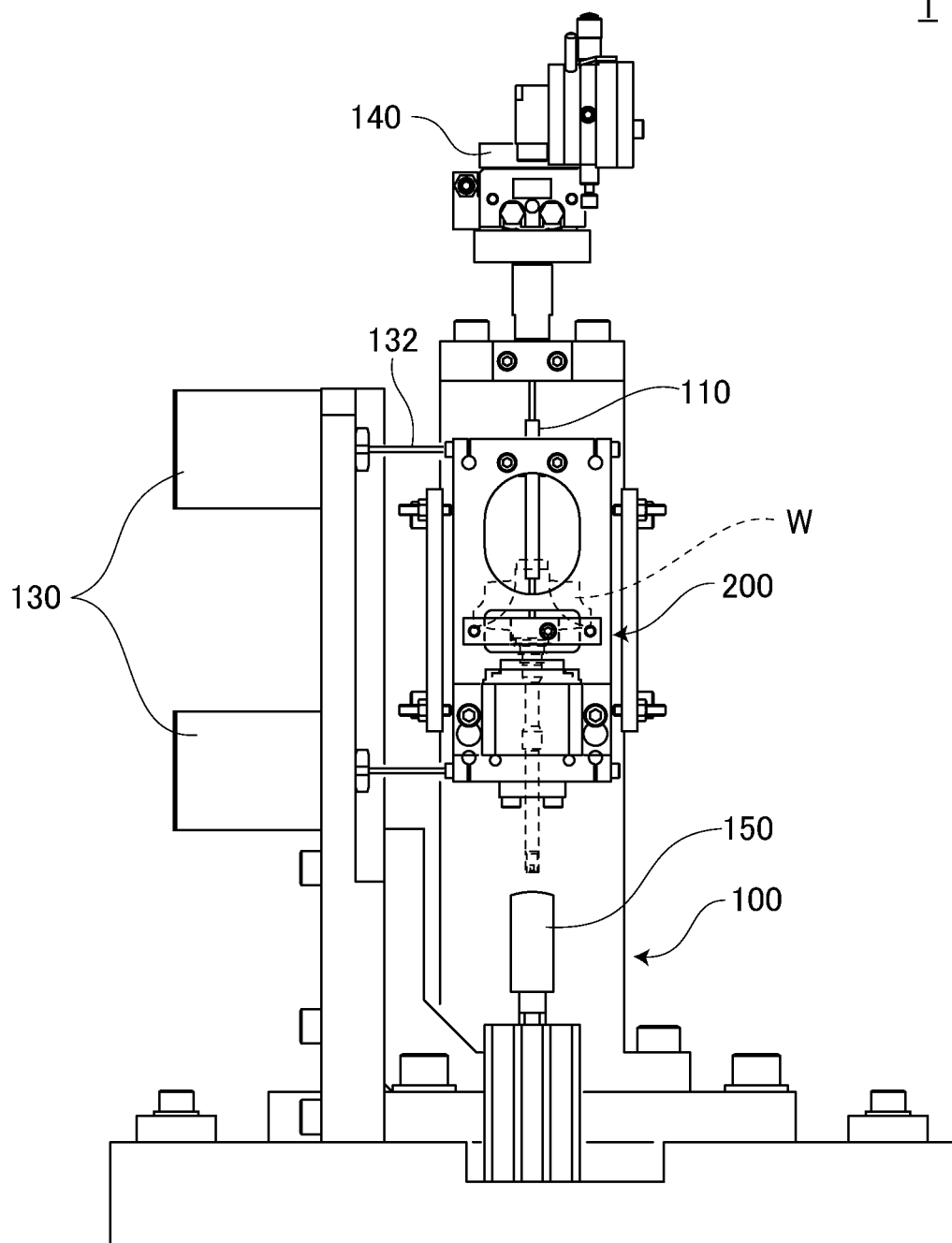
FIG. 1 is a front view of a main part of a dynamic balance testing device according to an embodiment of the present disclosure.
Figure 2:
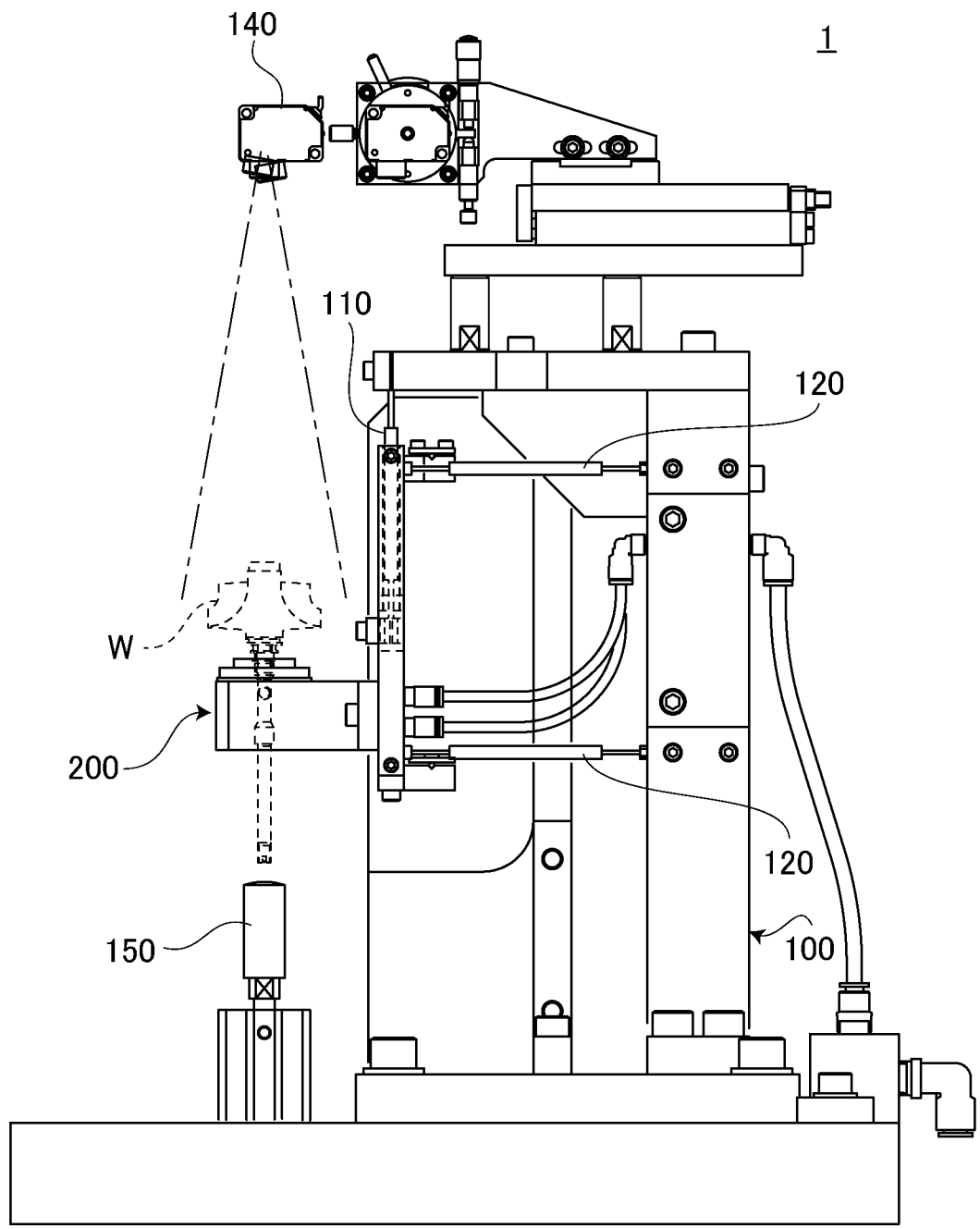
FIG. 2 is a right side view of the main part of the dynamic balance testing device according to the embodiment of the present disclosure.
Figure 3:
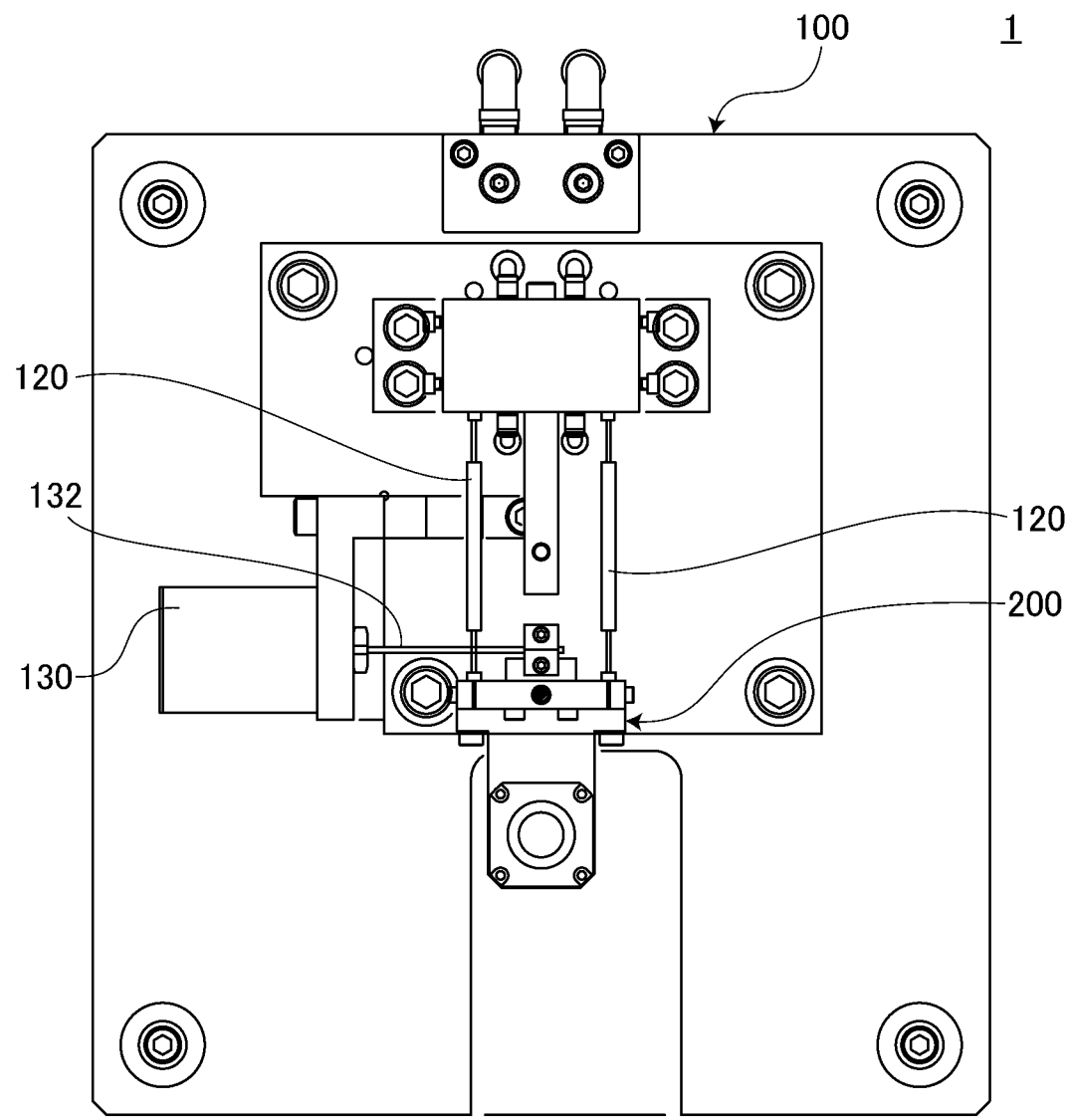
FIG. 3 is a plan view of the main part of the dynamic balance testing device according to the embodiment of the present disclosure.

FIG. 1, FIG. 2 and FIG. 3 are a front view, a right side view and a plan view of a main part of a dynamic balance testing device 1, respectively. In the following description, a right-left direction, a direction perpendicular to the paper surface and an up-down direction in FIG. 1 will be defined as an X-axis direction, a Y-axis direction and a Z-axis direction, respectively. It is noted that the Z-axis direction is a vertical direction, and the X-axis direction and the Y-axis direction are horizontal directions. Further, a near side (front side of the sheet) and a far side (back side of the sheet) in FIG. 1 is defined as front and rear, respectively.

The dynamic balance testing device 1 of the present embodiment is suitable for the dynamic balance test of a rotating body (specimen W) having blades, such as a turbine rotor of a supercharger. The dynamic balance testing device 1 is configured to be capable to rotationally drive the specimen W by blowing wind toward the blades of the specimen W, to measure vibration that occurs when the specimen W is rotationally driven, and to calculate dynamic balance of the specimen W based on the vibration measurement result.

The dynamic balance testing device 1 includes a vibrating unit 200 configured to rotatably hold the specimen W with a posture in which a rotation axis of the specimen W is oriented in the Z-axis direction, a drive unit 300 configured to rotationally drive the specimen W by blowing wind toward the blades of the specimen W held by the vibrating unit 200, and a mount 100 configured to support the vibrating unit 200 and the drive unit 300. The dynamic balance testing device 1 further includes a guiding unit 400, a changing unit 500 and a shifting unit 600 which will be described later. It is noted that, in FIGS. 1-3, illustrations of the drive unit 300, the guiding unit 400, the changing unit 500 and the shifting unit 600 are omitted.

As shown in FIGS. 1-3, the vibrating unit 200 is supported on the mount 100 by one vertical spring (first spring) 110 extending in the Z-axis direction and four horizontal springs (second springs) 120 extending in the Y-axis direction. The vertical spring 110 and the horizontal springs 120 are rod-like members that are substantially rigid in their longitudinal directions and that substantially only permit bending deformation. The vertical spring 110 supports the vibrating unit 200 from above in a hanging manner, and the horizontal springs 120 support the vibrating unit 200 from the rear side. Since displacement of the vibrating unit 200 in the Z-axis direction is restricted by the vertical spring 110 and the displacement of the vibrating unit 200 in the Y-axis direction is restricted by the horizontal springs 120, the vibrating unit 200 is substantially only allowed to translate (vibrate) in the X-axis direction and to rotate (vibrate) about the Y-axis direction.

The mount 100 includes two vibration sensor units 130 configured to measure vibration of the vibrating unit 200 in the X-axis direction, and a phase sensor unit 140 configured to detect a rotation phase of the specimen W. A tip of a sensor probe 132 of one of the vibration sensor units 130 is connected near an upper end of a back face of the vibrating unit 200, and the one of the vibration sensor units 130 measures vibration displacement of an upper face side of the vibrating unit 200. A tip of a sensor probe 132 of the other of the vibration sensor units 130 is connected near a lower end of the back face of the vibrating unit 200, and the other of the vibration sensor units 130 measures vibration displacement of a lower face side of the vibrating unit 200. The phase sensor unit 140 is a device configured to optically detect the rotation phase of the specimen W without contact.

The phase sensor unit 140 is attached to an upper part of the mount 100 and detects the rotation phase of the specimen W from straight above.

Figure 4:
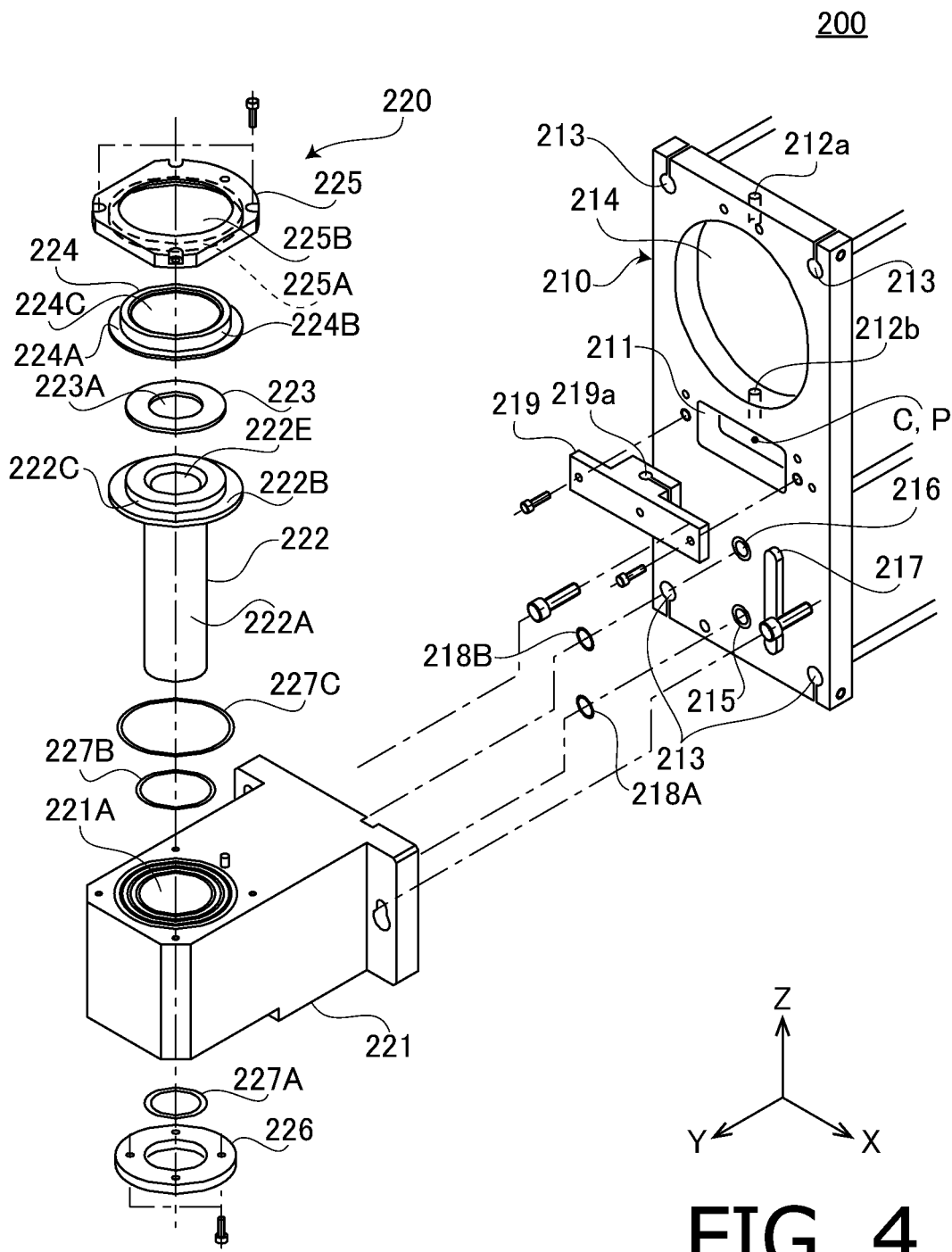
FIG. 4 is an exploded view of a vibrating unit of the dynamic balance testing device according to the embodiment of the present disclosure.

FIG. 4 is an exploded view of the vibrating unit 200. The vibrating unit 200 includes a base 210 and a bearing unit 220 detachably fixed on a front face of the base 210 by bolts. The bearing unit 220 forms an air bearing and rotatably holds the specimen W.

The base 210 is a substantially rectangular metal plate having sides parallel to the X-axis and sides parallel to the Z-axis. To an upper part of the base 210, a circular opening 214 penetrating in the Y-axis direction is formed. By providing the opening 214, since the weight of the vibrating unit 200 is reduced, the measurement sensitivity can be improved.

At substantially the center of the base 210, a substantially rectangular vertical spring attachment opening 211 penetrating in the Y-axis direction is formed. Also, the base 210 is provided with a vertical spring attachment member 219 for attaching the vertical spring 110 to the base 210. The vertical spring attachment member 219 is inserted in the vertical spring attachment opening 211 and is detachably fixed to the main body of the base 210 by bolts.

Also, to the base 210, two clearance holes 212a, 212b extending in the Z-axis direction are formed along a straight line going through a center of the opening 214. An upper clearance hole 212a penetrates from the upper face of the base 210 up to the opening 214, and a lower clearance hole 212b penetrates from a lower end of the opening 214 up to the vertical spring attachment opening 211. The vertical spring 110 is made to pass through the clearance hole 212a, the opening 214 and the clearance hole 212b. A tip of the vertical spring 110 is attached to the base 210 by being inserted in a vertical spring attaching part 219a of the vertical spring attachment member 219 which is inserted in the vertical spring attachment opening 211. The clearance holes 212a, 212b are formed with inner diameters sufficiently larger than an outer diameter of the vertical spring 110 to avoid contact with the vertical spring 110.

Also, at four corners of the substantially rectangular base 210, horizontal spring attaching parts 213 for attaching tips of the horizontal springs 120 are provided. The vertical spring attachment opening 211 is formed such that a central position C of the arrangement of the four horizontal spring attaching parts 213 (i.e., a position equidistant from each horizontal spring attaching part 213) is positioned substantially at the center of the vertical spring attachment opening 211. Therefore, in the present embodiment, a position where the vertical spring 110 is attached to the base 210 by the vertical spring attachment member 219 (vertical spring attachment position P) coincides with the central position C.

On a front face of a lower portion of the base 210 where the bearing unit 220 is to be attached, a key 217 extending in the Z-axis direction for positioning the bearing unit 220 is provided. Also, at the lower portion of the base 210, air supply holes 215, 216 through which compressed air to be supplied to the bearing unit 220 flows penetrate in the Y-axis direction.

The vibrating unit 200 of the present embodiment is configured such that a projection of a center of gravity of the specimen W held by the bearing unit 220 onto the base 210 coincides with the vertical spring attachment position P. In other words, the vibrating unit 200 of the present embodiment is configured such that the center of gravity of the specimen W is positioned on or near a straight line extending in the Y-axis direction from the vertical spring attachment position P. It is noted that the bearing unit 220 is detachably fixed to the base 210, and components of the bearing unit 220 which will be described later are detachably fixed to each other. Therefore, it is possible to attach the specimen W of various shapes and dimensions to the vibrating unit 200 such that the projection of the center of gravity of the specimen W coincides with the vertical spring attachment position P by replacing the bearing unit 220 and/or the components of the bearing unit 220 to those that are designed to adapt to the specimen W to be tested and to make the center of gravity of the specimen W coincide with the vertical spring attachment position P.

The measurement sensitivity of the dynamic balance testing device becomes higher as a difference value obtained by subtracting a displacement of an upper face side (lower face side) of the vibrating unit due to a predetermined imbalance amount of the specimen at its lower face side (upper face side) from a displacement of the upper face side (lower face side) of the vibrating unit due to the predetermined imbalance amount of the specimen at its upper face side (lower face side) gets larger. As described below with reference to FIGS. 5A, 5B, 6A and 6B, the above mentioned difference value of the vibrating unit 200 of the present embodiment is larger than those of conventional configurations such as the one described in Patent Document 1, and therefore the vibrating unit 200 of the present embodiment has higher measurement sensitivity than the conventional configurations.

Figure 5A:
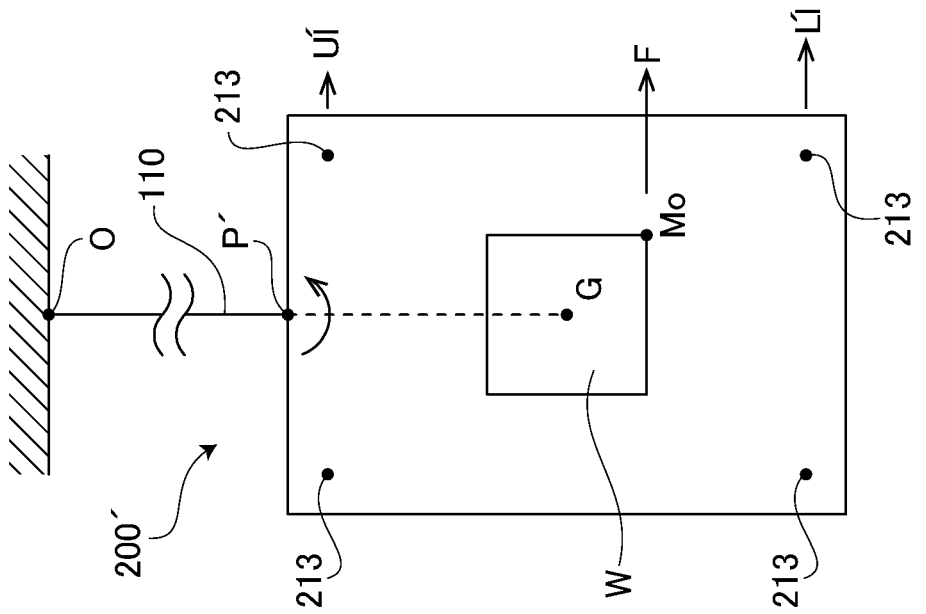
FIGS. 5A and 5B are diagrams illustrating vibration displacements occurring during dynamic balance test in a vibrating unit of a comparative example.
Figure 5B:
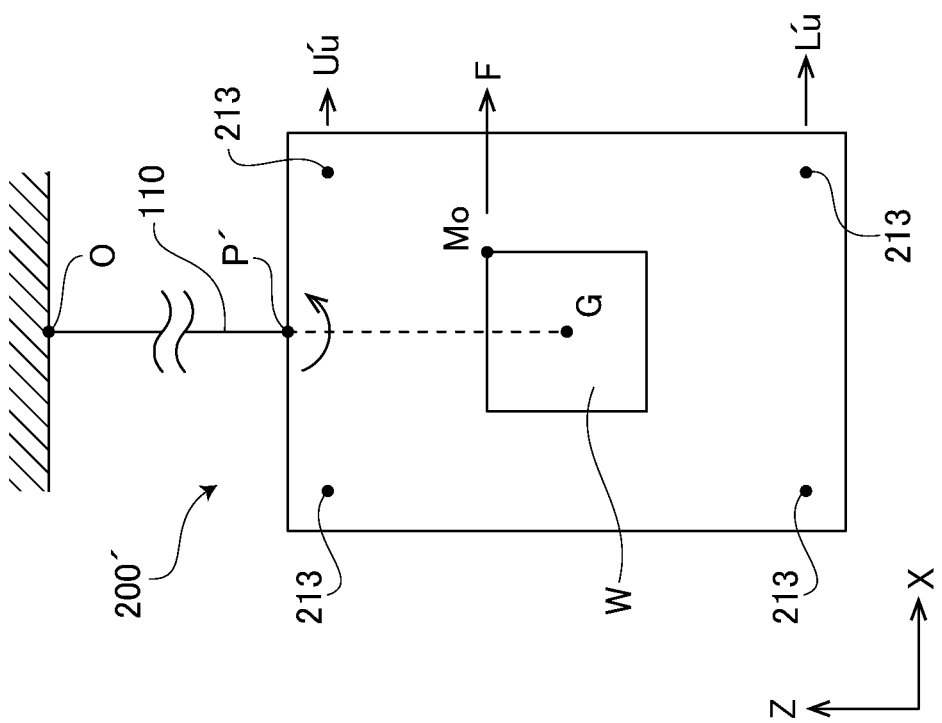
Figure 6B:
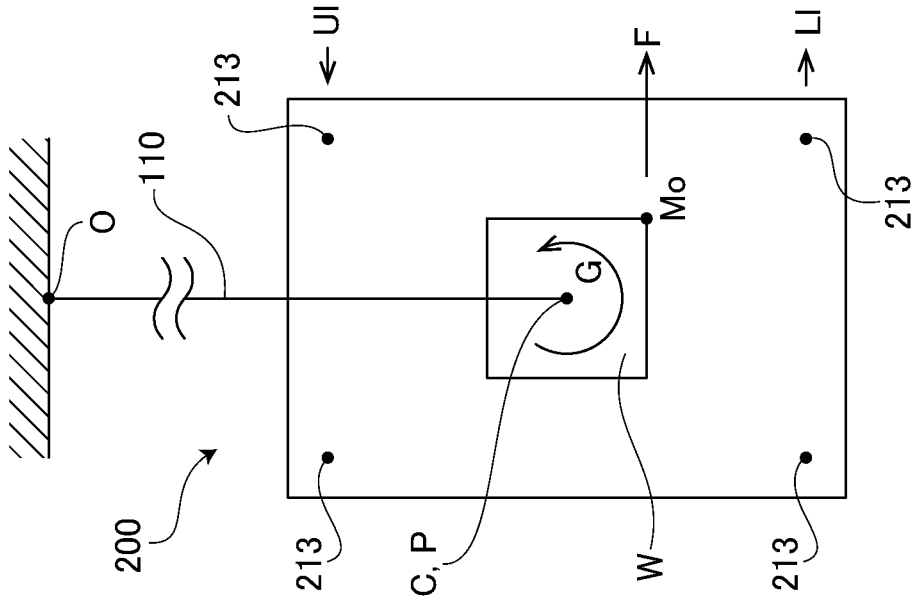
FIGS. 6A and 6B are diagrams illustrating vibration displacements occurring during dynamic balance test in the vibrating unit according to the embodiment of the present disclosure.
Figure 6A:
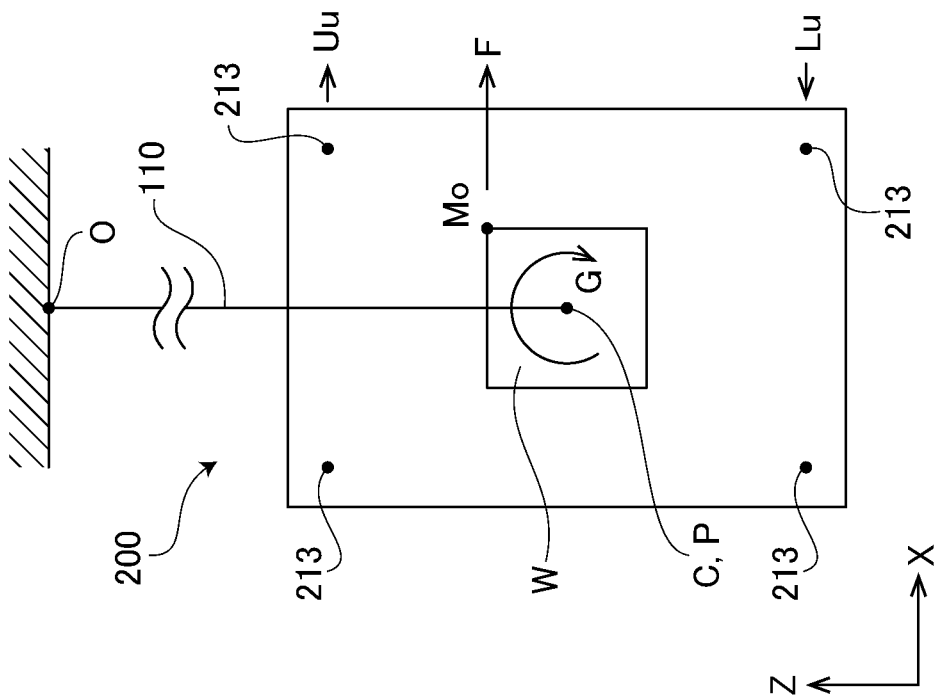

FIGS. 5A and 5B are diagrams illustrating vibration displacements occurring during dynamic balance test in a vibrating unit 200' of a comparative example, and FIGS. 6A and 6B are diagrams illustrating vibration displacements occurring during dynamic balance test in the vibrating unit 200 of the present embodiment. In FIGS. 5A and 5B, same numerals as the present embodiment are assigned to configurations corresponding to those of the vibrating unit 200 of the present embodiment. Unlike the vibrating unit 200 of the present embodiment, in the vibrating unit 200' of the comparative example, a vertical spring attachment position P' is positioned at a center of an upper end part of the base.

In FIGS. 5A, 5B, 6A and 6B, O indicates a vertical spring fixing position where the vertical spring 110 is fixed to the mount 100, G indicates a position of the center of gravity of the specimen W, Mo indicates a weight attached to the specimen W to provide the specimen W an imbalance, F indicates a centrifugal force occurring due to rotation of the weight Mo attached to the specimen W, Uu (U'u) indicates a displacement in the X-axis direction of the upper face side of the vibrating unit 200 (200') measured in a state where the weight Mo is attached to the upper face side of the specimen W, Ul (U'l) indicates a displacement in the X-axis direction of the upper face side of the vibrating unit 200 (200') measured in a state where the weight Mo is attached to the lower face side of the specimen W, Lu (L'u) indicates a displacement in the X-axis direction of the lower face side of the vibrating unit 200 (200') measured in a state where the weight Mo is attached to the upper face side of the specimen W, and Ll (L'l) indicates a displacement in the X-axis direction of the lower face side of the vibrating unit 200 (200') measured in a state where the weight Mo is attached to the lower face side of the specimen W. The displacements U'u (U'u) and Ul (U'l) are measured by the upper vibration sensor unit 130, and the displacements Lu (L'u) and Ll (L'l) are measured by the lower vibration sensor unit 130.

It is noted that the displacement of the vibrating unit 200 (200') is a sum of a displacement due to a bending vibration of the vertical spring 110 about the Y-axis with the vertical spring fixing position O as a pivot and a displacement due to a bending vibration of the vertical spring 110 about the Y-axis with the vertical spring attachment position P (P') as a pivot. However, in the following description, in order to describe a difference in the displacement of the vibrating unit 200 (200') in the X-axis direction caused by the difference in the vertical spring attachment position P (P'), the displacements Uu, Ul, Lu and Ll (U'u, U'l, L'u and L'l) will be described as the displacements due to the bending vibration of the vertical spring 110 about the Y-axis with the vertical spring attachment position P (P') as the pivot. Also, a direction of the centrifugal force F changes in accordance with the rotational phase of the specimen W but, in the following description, a state in which the centrifugal force is acting in the X-axis positive direction (rightward direction in the Figures) will be described.

FIGS. 5A and 6A are diagrams illustrating the case where the weight Mo is added to the upper face side of the specimen W, and FIGS. 5B and 6B are diagrams illustrating the case where the weight Mo is added to the lower face side of the specimen W. As shown in FIG. 5A, in the vibrating unit 200' of the comparative example, in the case where the weight Mo is added to the upper face side of the specimen W, a moment that makes the vibrating unit 200' to rotate about the vertical spring attachment position P' in the counterclockwise direction in the figure occurs by the centrifugal force F. Therefore, both the displacement U'u and the displacement L'u are displacements in the X-axis positive direction (rightward direction in the figure) (It is noted that the displacement U'u is very small.). Also, as shown in FIG. 5B, in the vibrating unit 200' of the comparative example, in the case where the weight Mo is added to the lower face side of the specimen W, a moment that makes the vibrating unit 200' to rotate about the vertical spring attachment position P' in the counterclockwise direction in the figure occurs by the centrifugal force F. Therefore, both the displacement U'l and the displacement L'l are displacements in the X-axis positive direction. That is, regardless of whether the weight is added to the upper face side or to the lower face side of the specimen W, the upper face side and the lower face side of the vibrating unit 200' displace in the same direction.

Therefore, in the vibrating unit 200' of the comparative example, regardless of whether the weight Mo is added to the upper face side or to the lower face side of the specimen W, the displacements U'u, U'l, L'u and L'l in the X-axis positive direction (rightward direction in the figures) are added to the displacement in the X-axis positive direction due to the centrifugal force F with the vertical spring fixing position O as the pivot, and thus the displacement of the vibrating unit 200' in the X-axis positive direction (rightward direction in the figures) gets larger.

In contrast, as shown in FIG. 6A, in the vibrating unit 200 of the present embodiment, in the case where the weight Mo is added to the upper face side of the specimen W, a moment that makes the vibrating unit 200 to rotate about the vertical spring attachment position P in the clockwise direction in the figure occurs by the centrifugal force F. Therefore, similarly to the comparative example, the displacement Uu is a displacement in the X-axis positive direction (rightward direction in the figure), but, unlike the comparative example, the displacement Lu is a displacement in the X-axis negative direction (leftward direction in the figure). Also, as shown in FIG. 6B, in the case where the weight Mo is added to the lower face side of the specimen W, a moment that makes the vibrating unit 200 to rotate about the vertical spring attachment position P in the counterclockwise direction in the figure occurs. Therefore, similarly to the comparative example, the displacement Ll is a displacement in the X-axis positive direction (rightward direction in the figure), but, unlike the comparative example, the displacement Ul is a displacement in the X-axis negative direction (leftward direction in the figure).

Therefore, in the vibrating unit 200 of the present embodiment, in the case where the weight Mo is added to the upper face side of the specimen W, the displacement Uu in the X-axis positive direction (rightward direction in the figures) is added to the displacement of the upper face side of the vibrating unit 200 in the X-axis positive direction due to the centrifugal force F with the vertical spring fixing position O as the pivot, and thus the displacement of the upper face side of the vibrating unit 200 gets larger, and the displacements Lu in the X-axis negative direction (leftward direction in the figures) is subtracted from the displacement of the upper face side of the vibrating unit 200 in the X-axis positive direction (rightward direction in the figures) due to the centrifugal force F with the vertical spring fixing position O as the pivot, and thus the displacement of the lower face side of the vibrating unit 200 gets smaller. Similarly, in the case where the weight Mo is added to the lower face side of the specimen W, the displacement Ll in the X-axis positive direction (rightward direction in the figures) is added to the displacement of the upper face side of the vibrating unit 200 in the X-axis positive direction due to the centrifugal force F with the vertical spring fixing position O as the pivot, and thus the displacement of the upper face side of the vibrating unit 200 gets larger, and the displacements Ul in the X-axis negative direction (leftward direction in the figures) is subtracted from the displacement of the upper face side of the vibrating unit 200 in the X-axis positive direction (rightward direction in the figures) due to the centrifugal force F with the vertical spring fixing position O as the pivot, and thus the displacement of the lower face side of the vibrating unit 200 gets smaller.

Therefore, as compared to the vibrating unit 200' of the comparative example, in the vibrating unit 200 of the present embodiment, the difference value obtained by subtracting the displacement of the upper face side (lower face side) of the vibrating unit 200 due to the predetermined imbalance amount of specimen W at its lower face side (upper face side) from the displacement of the upper face side (lower face side) of the vibrating unit 200 due to the predetermined imbalance amount of the specimen W at its upper face side (lower face side) gets larger. As described above, the larger the above mentioned difference value, the higher the sensitivity of the dynamic balance testing device. Therefore, the vibrating unit 200 of the present embodiment has higher sensitivity as compared to the vibrating unit 200' of the comparative example.

Also, in the vibrating unit 200 of the present embodiment, since the central position C of the four horizontal spring attaching parts 213 and the vertical spring attachment position P coincide, a rotation angle of the vibrating unit 200 in the clockwise direction in FIGS. 5A, 5B, 6A and 6B in the case where the weight Mo is added to the upper face side of the specimen W and a rotation angle of the vibrating unit 200 in the counterclockwise direction in the Figures in the case where the weight Mo is added to the lower face side of the specimen W are substantially the same. Therefore, the measurement sensitivity to the imbalance at the upper face side of the specimen W and the measurement sensitivity to the imbalance at the lower face side of the specimen W can be made the same, thereby making it possible to measure the imbalance with high accuracy regardless of whether the imbalance is at the upper face side or at the lower face side.

It is noted that the shape of the base 210 and the positions of the vertical spring 110 and the horizontal springs 120 are not limited to those of the present embodiment, provided that a plane on which the four horizontal spring attaching parts 213 are arranged is parallel to the rotation axis of the specimen W and that the central position C of the arrangement of the four horizontal spring attaching parts 213, the vertical spring attachment position P and the center of gravity of the specimen W are in the positional relationship described above (i.e., the positional relationship in which the central position C, the vertical spring attachment position P and the center of gravity of the specimen W are aligned in the Y-axis direction and the central position C and the vertical spring attachment position P coincide.). Also, the base 210 and the bearing unit 220 may be integrally formed as one member. Also, the number of horizontal springs 120 may be equal to or more than three that makes it possible to stably support the base 210.

Figure 7:
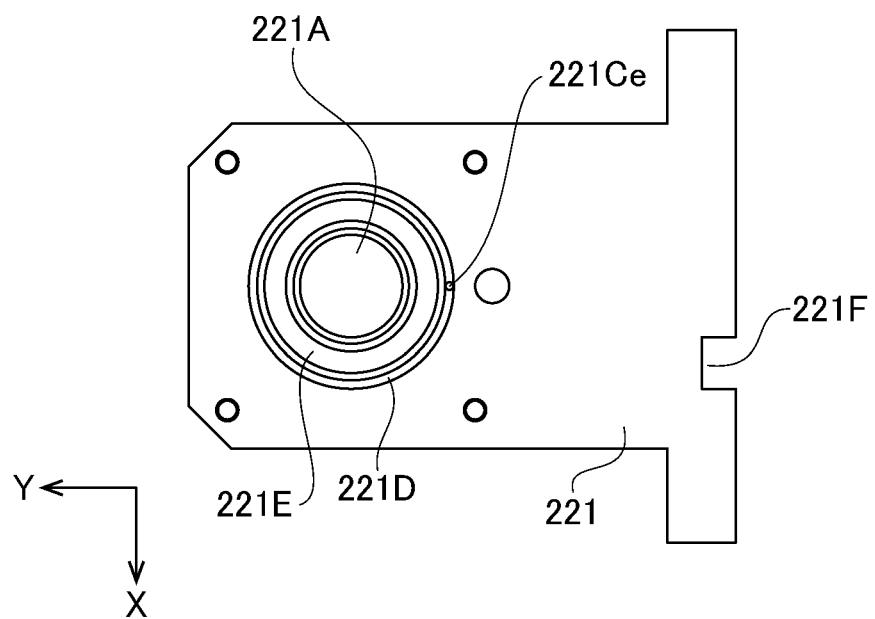
FIG. 7 is a plan view of a bearing housing of the dynamic balance testing device according to the embodiment of the present disclosure.
Figure 8:
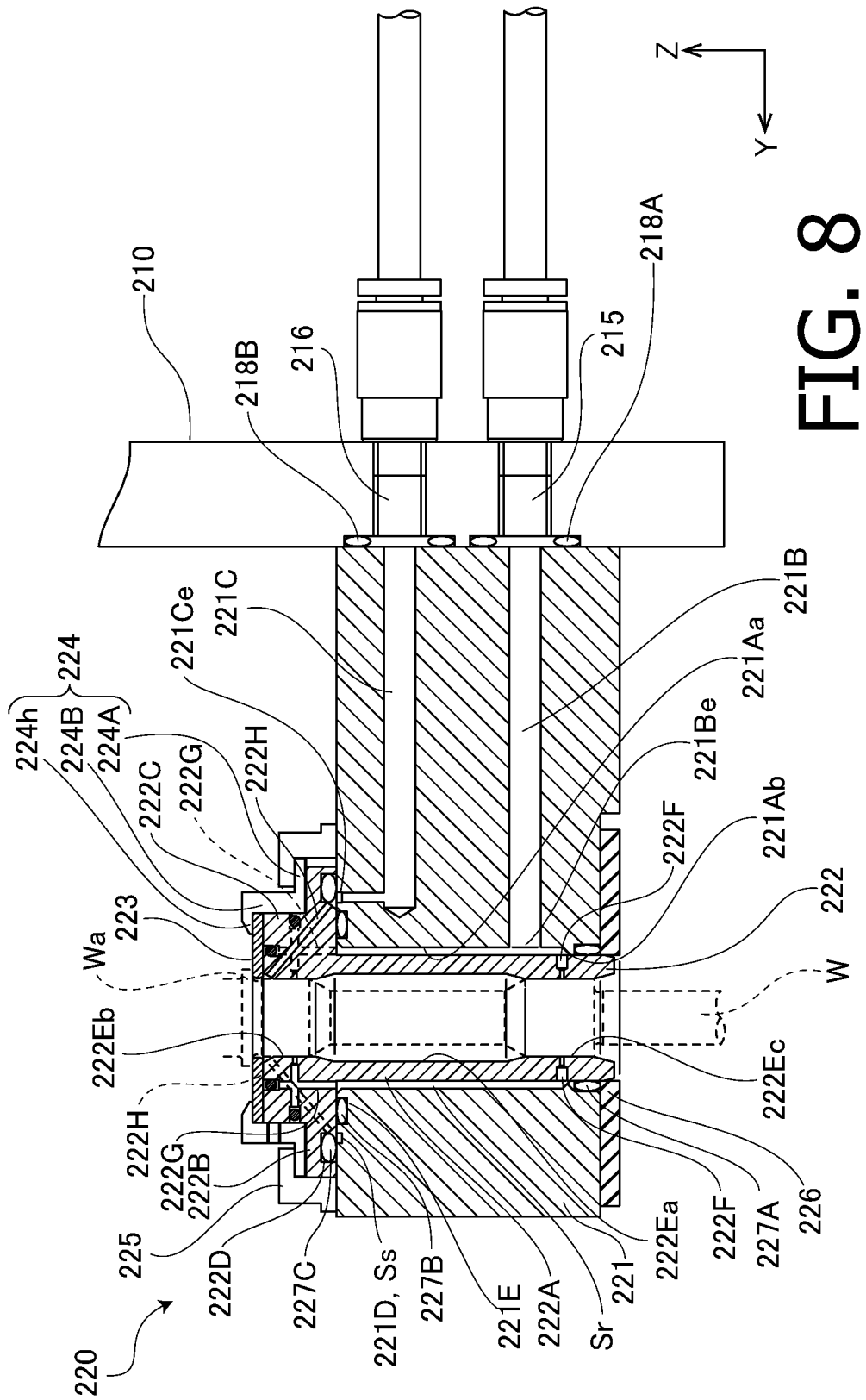
FIG. 8 is a cross section view of a bearing unit of the dynamic balance testing device according to the embodiment of the present disclosure.

FIG. 7 and FIG. 8 are a plan view of a bearing housing 221 and a cross section view of the bearing unit 220, respectively. As shown in FIGS. 4 and 8, the bearing unit 220 includes a bearing housing 221, a radial bearing member 222, a thrust bearing member 223, a positioning member 224, a fixing member 225 and a sealing member 226. The radial bearing member 222, the thrust bearing member 223 and the sealing member 226 are replaceable members, and those adapted to an outer diameter of a journal of the specimen W are used.

The radial bearing member 222 is accommodated inside the bearing housing 221, and the thrust bearing member 223 is disposed on an upper surface of the radial bearing member 222. The positioning member 224 is a member configured to position the thrust bearing member 223 with respect to the radial bearing member 222. The fixing member 225 is a member configured to position and fix the radial bearing member 222, the thrust bearing member 223 and the positioning member 224 with respect to the bearing housing 221. The sealing member 226 is a member configured to press and fix an O ring 227A, configured to seal a lower end of a space Sr which will be described later, from below.

To the bearing housing 221, a substantially columnar hollow part 221A penetrating in the Z-axis direction is formed. The hollow part 221A has a stepped shape having a large-diameter part 221Aa being a main part and a small-diameter part 221Ab formed at a lower end part and having a diameter smaller than the large-diameter part 221Aa. Also, as shown in FIG. 7, to the bearing housing 221, a groove 221F configured to fit with a key 217 provided to the base 210 to position the bearing housing 221 with respect to the base 210 is formed.

To the bearing housing 221, channels 221B and 221C through which compressed air for forming an air bearing flows are formed. Compressed air that flows through the channel 221B is supplied to the radial bearing member 222, and compressed air that flows through the channel 221C is supplied to the thrust bearing member 223. One end (an inlet port) of each of the channels 221B and 221C is connected to respective air supply holes 215 and 216 of the base 210 via respective O rings 218A and 218B.

At the large-diameter part 221Aa of the hollow part 221A, the other end of the channel 221B (an outlet port 221Be) opens. Also, as shown in FIG. 7, to an upper surface of the bearing housing 221, two annular grooves 221D and 221E are formed concentrically with the hollow part 221A. An outlet port 221Ce of the channel 221C opens at a bottom surface of the outer groove 221D. In the inner groove 221E, an O ring 227B is accommodated.

The radial bearing member 222 is a substantially tubular member, and a substantially columnar hollow part 222E penetrating in the Z-axis direction is formed. To the hollow part 222E, the journal of the specimen W is to be inserted. The radial bearing member 222 is sectionalized, based on its outer diameters, into a tubular part 222A, a flange part 222B and a protruding part 222C in this order from below.

The tubular part 222A is a substantially cylindrical portion to be accommodated inside the hollow part 221A of the bearing housing 221 and having the smallest outer diameter, and has an outer diameter that is substantially the same as an inner diameter of the small-diameter part 221Ab of the hollow part 221A.

The flange part 222B is a disk-shaped portion having an outer diameter larger than an outer diameter of the outer groove 221D of the bearing housing 221. The flange part 222B is disposed on the upper surface of the bearing housing 221 in a state where the radial bearing member 222 is mounted to the bearing housing 221.

The protruding part 222C is a substantially cylindrical portion protruding upward from a central portion of an upper surface of the flange part 222B and having an outer diameter smaller than the outer diameter of the flange part 222B.

To a lower surface of the flange part 222B of the radial bearing member 222, an annular groove 222D in which an O ring 227C is to be accommodated is concentrically formed. An inner periphery of the groove 222D has substantially the same diameter as an inner periphery of the groove 221D of the bearing housing 221, and a width of the groove 222D is formed to be wider than a width of the groove 221D.

The hollow part 222E of the radial bearing member 222 has a large-diameter part 222Ea positioned at a central portion in the Z-axis direction, a small-diameter part 222Eb positioned at an upper portion, and a small-diameter part 222Ec positioned at a lower portion. The small-diameter part 222Eb is formed to the protruding part 222C, the large-diameter part 222Ea is formed to an upper portion of the tubular part 222A, and the small-diameter part 222Ec is formed to a lower portion of the tubular part 222A. Between peripheral surfaces of the small-diameter parts 222Eb and 222Ec and the journal of the specimen W, radial air bearings are to be formed.

To a lower portion of the tubular part 222A, a plurality of radial bearing air supply holes 222F penetrating the tubular part 222A in radial directions and opening at the small-diameter part 222Ec are formed at regular intervals in a circumferential direction. Also, to an upper portion of the radial bearing member 222 (a portion consisting of the flange part 222B and the protruding part 222C disposed outside the bearing housing 221), a plurality of radial bearing air supply holes 222G connecting an outer periphery and an inner periphery of the radial bearing member 222 are formed at regular intervals in a circumferential direction. One end (an inlet port) of the radial bearing air supply hole 222G opens at a lower surface of the flange part 222B near a base of the flange part 222B (a position facing a peripheral edge of the hollow part 221A), and the other end (an outlet port) opens at an inner peripheral surface of the small-diameter part 222Eb. Also, at an upper portion of the radial bearing member 222, a plurality of thrust bearing air supply holes 222H connecting a lower end portion of an inner periphery of the groove 222D and an upper end portion of an inner periphery of the small-diameter part 222Eb are formed at regular intervals in a circumferential direction.

In a state where the radial bearing member 222 is mounted to the bearing housing 221, a cylindrical space Sr is formed between the tubular part 222A of the radial bearing member 222 and a peripheral surface of the hollow part 221A (the large-diameter part 221Aa) of the bearing housing 221. The space Sr is to be filled with compressed air supplied from the outlet 221Be of the channel 221B.

Also, a space Ss surrounded by the groove 221D of the bearing housing 221, a lower end portion of the inner periphery of the groove 222D of the radial bearing member 222 and the O ring 227C is formed. The space Ss is to be filled with compressed air supplied from the outlet port 221Ce of the channel 221C. The space Sr is sealed with the O rings 227A and 227B, and the space Ss is sealed with the O rings 227B and 227C. Each of the radial bearing air supply holes 222F and 222G is connected to the space Sr at one end thereof (an inlet port) and supplies compressed air inside the space Sr to the small-diameter parts 222Eb and 222Ec. Also, the thrust bearing air supply holes 222H are connected to the space Ss and supply compressed air inside the space Ss to an inner periphery of the thrust bearing member 223.

The thrust bearing member 223 is a perforated disk-shaped (flat-washer-shaped) precision member having substantially the same inner diameter and outer diameter as the protruding part 222C of the radial bearing member 222. To an opening 223A of the thrust bearing member 223, the journal of the specimen W is to be inserted. In a state where compressed air is not supplied from the thrust bearing air supply holes 222H, a flange part Wa of the specimen W is disposed on an inner peripheral portion of an upper surface of the thrust bearing member 223.

When compressed air is supplied from the thrust bearing air supply holes 222H, a thrust air bearing is formed between the inner peripheral portion of the upper surface of the thrust bearing member 223 and the flange part Wa of the specimen W, and the specimen W floats off the thrust bearing member 223. When the supply of compressed air is stopped, the specimen descends and the flange part Wa is placed on the thrust bearing member 223. If the supply of compressed air stops before the rotation of the specimen W stops completely, since friction occurs between the flange part Wa and the thrust bearing member 223, the upper surface of the thrust bearing member 223 gradually wears away. If the wear amount of the thrust bearing member 223 increases, it becomes impossible to form good thrust air bearing and the floating of the specimen W becomes unstable. Therefore, the thrust bearing member 223 needs to be replaced periodically. Since the thrust bearing member 223 of the present embodiment is formed in the flat plate shape, the thrust bearing member 223 can be turned to use both sides for the formation of the thrust air bearing. Since, by this configuration, the lifetime of the thrust bearing member 223 is substantially doubled, it becomes possible to cut costs for the replacement of the thrust bearing member 223.

The positioning member 224 is an annular member to which a substantially columnar hollow part 224C penetrating in the Z-axis direction is formed and has a flange part 224A and a cylindrical part 224B. The cylindrical part 224B is a substantially cylindrical portion extending vertically. An inner diameter of the cylindrical part 224B is substantially the same as the outer diameters of the protruding part 222C of the radial bearing member 222 and the thrust bearing member 223, and the hollow part 224C of the cylindrical part 224B accommodates the protruding part 222C of the radial bearing member 222 and the thrust bearing member 223 without clearance therebetween.

The flange part 224A is a substantially disk-shaped portion protruding radially outward from a lower end portion of the cylindrical part 224B and has substantially the same outer diameter as the flange part 222B of the radial bearing member 222.

At an upper end portion of the cylindrical part 224B, a tab 224h protruding radially inward is formed over the entire circumference thereof. An inner diameter of the tab 224h is smaller than the outer diameters of the protruding part 222C and the thrust bearing member 223 but is larger than the diameter of the opening 223A of the thrust bearing member 223.

A depth of the hollow part 224C of the positioning member 224 (a distance from a lower surface of the flange part 224A to a lower surface of the tab 224h) is the sum of a height of the protruding part 222C of the radial bearing member 222 and a height of the thrust bearing member 223. Therefore, the hollow part 224C of the positioning member 224 is configured to accommodate the protruding part 222C of the radial bearing member 222 and the thrust bearing member 223 without clearance in the up-down direction as well. That is, the present embodiment has a structure in which the thrust bearing member 223 is positioned with respect to the radial bearing member 222 by the positioning member 224.

The fixing member 225 is an annular member. The fixing member 225 has a columnar hollow part 225A formed to extend from a bottom surface up to, but not including, the upper surface of the fixing member 225, and a circular opening 225B penetrating from an upper end of the hollow part 225A up to an upper surface of the fixing member 225. The hollow part 225A has substantially the same diameter as the flange part 222B of the radial bearing member 222 and the cylindrical part 224B of the positioning member 224. The opening 225B is formed concentrically with the hollow part 225A and has a diameter that is smaller than the hollow part 225A but larger than the cylindrical part 224B of the positioning member 224. To the fixing member 225, four holes to insert screws for fixing are formed outside of the hollow part 225A.

The hollow part 225A is formed to have a depth that is the sum of a height of the flange part 222B of the radial bearing member 222 and a height of the flange part 224A of the positioning member 224. Therefore, in a state where a lower surface of the fixing member 225 is contacting the upper surface of the bearing housing 221, an upper surface of the flange part 224A contacts an upper end surface of the hollow part 225A, the lower surface of the flange part 224A contacts the upper surface of the flange part 222B, and the lower surface of the flange part 222B contacts the upper surface of the bearing housing 221. That is, the present embodiment has a structure in which the positioning member 224, the thrust bearing member 223 and the radial bearing member 222 are fixed to the bearing housing 221 by fixing the fixing member 225 to the bearing housing 221.

By configuring to fix the positioning member 224, the thrust bearing member 223 and the radial bearing member 222 to the bearing housing 221 by the fixing of the fixing member 225 to the bearing housing 221, it becomes possible to replace the radial bearing member 222, the thrust bearing member 223 and the positioning member 224 only by the detachment and attachment of the screws that fix the fixing member 225. Therefore, not only the replacement of components of the bearing in accordance with dimensions of the specimen W but also replacement of components, such as the thrust bearing member 223 which is easy to wear, for maintenance is facilitated. Also, since the thrust bearing member 223 is formed such that both sides can be used as the surface for forming the thrust air bearing, even if one side is worn, the thrust air bearing can be reused by using the other side as the bearing surface, and thereby frequency of replacing components can be reduced. Furthermore, by designing the thrust bearing member 223 in a shape that is easy to form as in the present embodiment, unit price of the component can also be reduced.

It is noted that, since the frequency of replacing components can be reduced provided that the replacement of the thrust bearing member 223 is easy and both sides of the thrust bearing member 223 are configured to be able to be used as the thrust bearing surface, the positioning member 224 and the fixing member 225 may be formed as one component. Also, the thrust bearing member 223 needs not be disk-shaped but may have different shapes that can be used even if it is turned over. Furthermore, the bearing housing 221 and the radial bearing member 222 may be formed as one component.

Figure 9:
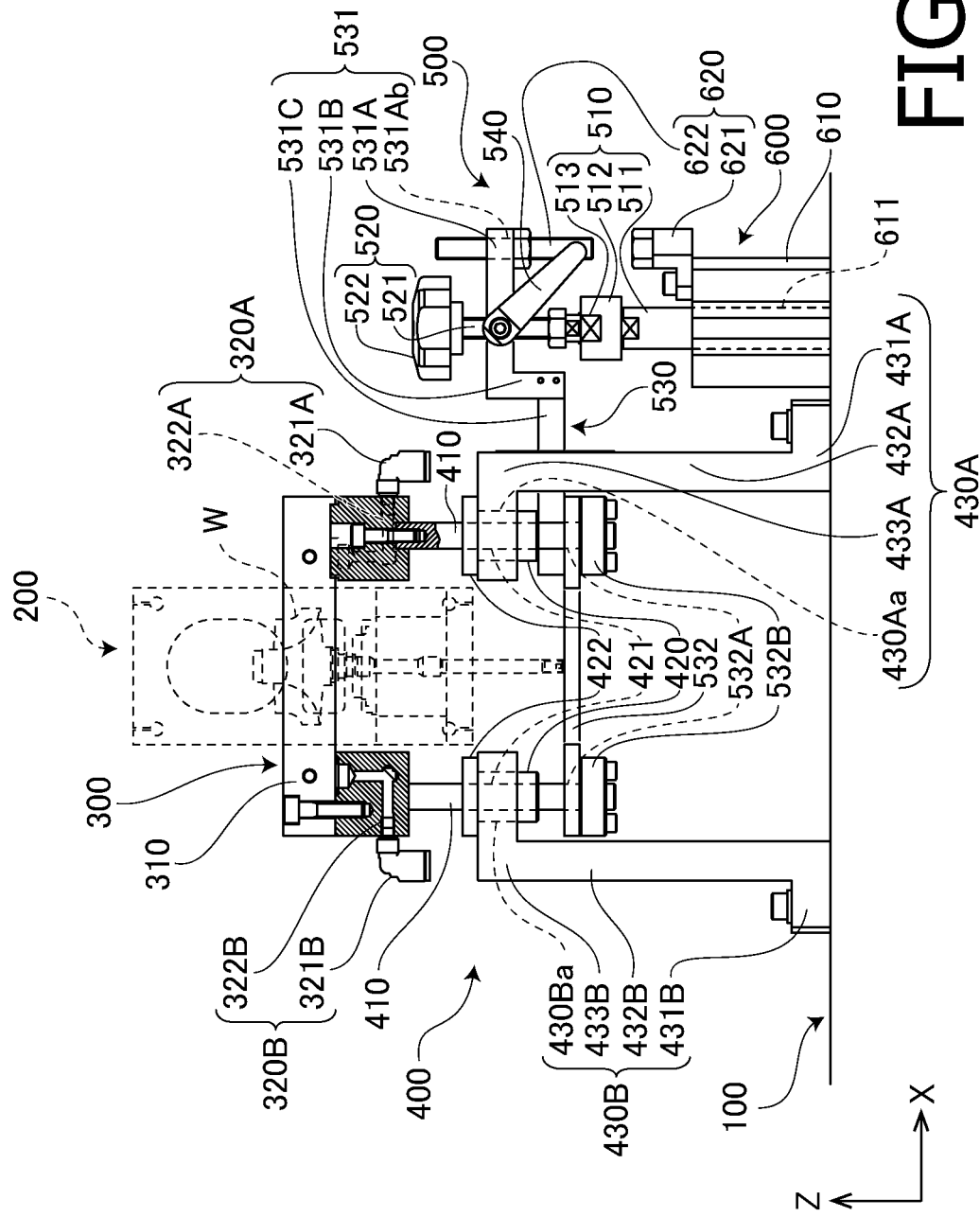
FIG. 9 is a front view of a drive unit, a guiding unit, a changing unit and a shifting unit of the dynamic balance testing device according to the embodiment of the present disclosure.
Figure 10:
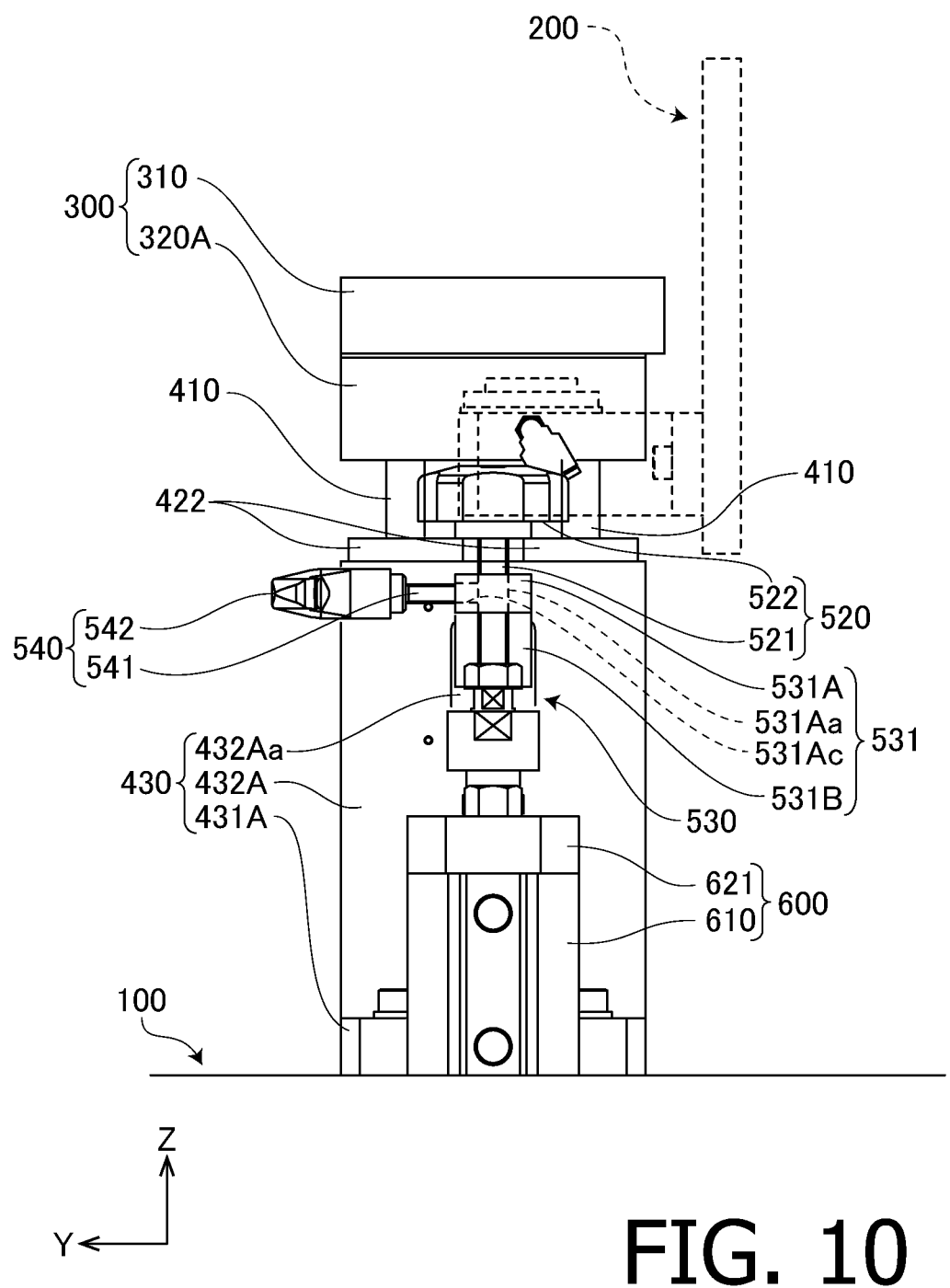
FIG. 10 is a right side view of the drive unit, the guiding unit, the changing unit and the shifting unit of the dynamic balance testing device according to the embodiment of the present disclosure.
Figure 11:
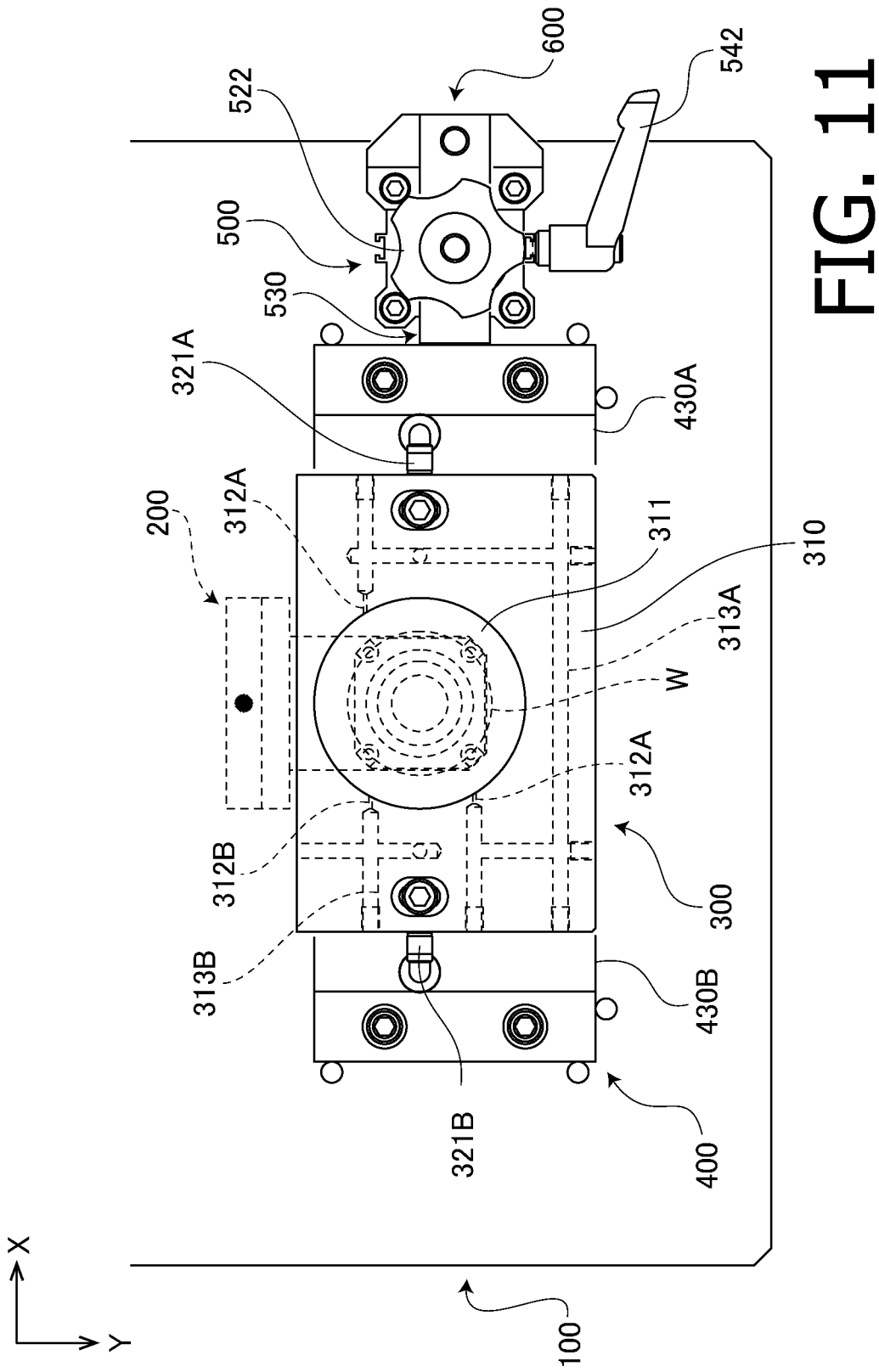
FIG. 11 is a plan view of the drive unit, the guiding unit, the changing unit and the shifting unit of the dynamic balance testing device according to the embodiment of the present disclosure.

FIG. 9, FIG. 10 and FIG. 11 are a front view, a right side view and a plan view of an additional mechanism section (the drive unit 300, the guiding unit 400, the changing unit 500 and the shifting unit 600) of the dynamic balance testing device 1, respectively.

As shown in FIGS. 9-11, the drive unit 300 includes a blowing nozzle member 310 and a relay member 320. The blowing nozzle member 310 is a substantially rectangular metal member, and a columnar hollow part 311 penetrating in the Z-axis direction is formed. The hollow part 311 is a portion that surrounds the blades of the specimen W during the test. Therefore, the hollow part 311 is formed to have a diameter sufficiently larger than an outer diameter of the specimen W so that an inner peripheral surface of the hollow part 311 does not contact the specimen W.

To the inner peripheral surface of the hollow part 311, three nozzles 312 configured to blow air toward the specimen W are formed. Two of the three nozzles 312 are forward blowing nozzles 312A oriented to rotationally drive the specimen W in a forward direction (counterclockwise direction when viewed from above), and one of the thee nozzles 312 is a reverse blowing nozzle 312B oriented to rotationally drive the specimen W in a direction opposite to the forward direction (clockwise direction when viewed from above).

To the blowing nozzle member 310, channels 313A and 313B are formed. One end of the channel 313A opens at a right side of a lower surface of the blowing nozzle member 310, and the other end of the channel 313A bifurcates and connects to the two forward blowing nozzles 312A. One end of the channel 313B opens at a left side of the lower surface of the blowing nozzle member 310, and the other end of the channel 313B connects to the reverse blowing nozzle 312B.

During the dynamic balance test, the blowing nozzle member 310 rotationally drives the specimen W in the counterclockwise direction by the forward blowing nozzle 312A, and after the measurement, the blowing nozzle member 310 applies a brake to the rotation of the specimen W by generating a driving force in the clockwise direction by the reverse blowing nozzle 312B. By configuring to apply a brake to the rotation by using the reverse blowing nozzle 312B, a duration of the test from the end of the measurement to the removal of the specimen W can be shortened.

The relay member 320 is divided into a relay member 320A fixed to a right end of the lower surface of the blowing nozzle member 310 and a relay member 320B fixed to a left end of the lower surface of the blowing nozzle member 310. To the relay members 320A and 320B, the channels 322A and 322B are respectively formed. One end of each of the channels 322A and 322B is connected to respective one of the channels 313A and 313B of the blowing nozzle member 310. The other end of respective channels 322A and 322B are coupled to corresponding compressed air suppliers (not shown) via respective coupling parts 321A and 321B.

It is noted that the drive unit 300 is not limited to the configuration of the present embodiment provided that the it includes nozzles for blowing air onto the specimen to rotationally drive the specimen W. For example, since the specimen W can be rotationally driven if there is one or more forward blowing nozzles 312A, it is sufficient to provide one or more forward blowing nozzles 312A to the blowing nozzle member 310. It is noted that, in place of the reverse blowing nozzle 312B, different braking means such as a mechanism that apply a brake by a friction force by contacting the journal or the like of the specimen W may be provided.

The drive unit 300 is supported by the mount 100 via the guiding unit 400, the changing unit 500, and the shifting unit 600. The guiding unit 400 includes four supporting rods 410, four guides 420, and two guide support frames 430A and 430B.

The supporting rods 410 are columnar members. Upper ends of two supporting rods 410 are fixed to the relay member 320A, and upper ends of the remaining two supporting rods 410 are fixed to the relay member 320B.

The guide 420 is a cylindrical member to which a hollow part 421 configured to support the supporting rod 410 slidably in an axial direction of the supporting rod 410 is formed. At an upper end portion of the guide 420, a large-diameter part 422 having a diameter larger than a lower portion of the guide 420 is formed.

The guide support frames 430A and 430B are metal members formed in crank shapes when viewed in the Y-axis direction and extending in the Y-axis direction, and are arranged to oppose to each other in the X-axis direction. The guide support frames 430A and 430B respectively have fixing parts 431A and 431B, vertical parts 432A and 432B, and guide support parts 433A and 433B. The vertical parts 432A and 432B are rectangular flat-plate-shaped portions disposed perpendicularly to the X-axis. From lower ends of the vertical parts 432A and 432B, the fixing parts 431A and 431B for fixing the guide support frames 430A and 430B to the mount 100 with bolts respectively protrude outwardly in the X-axis direction. From upper ends of the vertical parts 432A and 432B, the guide support parts 433A and 433B configured to support the guides 420 respectively protrude inwardly in the X-axis direction.

To the fixing parts 431A and 431B, a plurality of holes to insert bolts for fixing the guide support frames 430A and 430B to the mount 100 are formed.

At the center of an upper portion of the vertical part 432A of the guide support frame 430A, a substantially rectangular opening 432Aa penetrating in the X-axis direction is formed.

To the guide support parts 433A and 433B, two columnar through holes 430Aa and two columnar through holes 430Ba respectively penetrate in the Z-axis direction. The through holes 430Aa and 430Ba have substantially the same diameter as outer diameters of lower portions of the guides 420, and the lower portions of respective guides 420 are accommodated therein. The guides 420 are supported by the guide support parts 433A and 433B in a state where the large-diameter parts 422 are placed on upper surfaces of the guide support parts 433A and 433B.

To the hollow parts 421 of the guides 420 which are accommodated inside the through holes 430Aa of the guide support frame 430A, the supporting rods 410 fixed to the relay member 320A of the drive unit 300 are slidably inserted. Also, to the guides 420 which are accommodated inside the through holes 430Ba of the guide support frame 430B, the supporting rods 410 fixed to the relay member 320B are inserted. The guide support frame 430A and 430B are fixed on the mount 100 while orienting the guide support part 433A leftward and the guide support part 433B rightward and being disposed at an interval in the X-axis direction. The drive unit 300 is guided by the guiding unit 400 to be movable with respect to the mount 100 only in the Z-axis direction.

The drive unit 300 is supported on the mount 100 via the supporting rod 410 of the guiding unit 400, the changing unit 500 and the shifting unit 600 so as not to freely move in the up-down direction.

The changing unit 500 includes a supporting member 510, a screw 520, a coupling part 530, and a lock member 540.

The supporting member 510 is a stepped columnar member extending in the Z-axis direction and having a small-diameter part 511 and a large-diameter part 512. The supporting member 510 is supported by the shifting unit 600 in a state where the small-diameter part 511 is at the lower side. To an upper surface of the supporting member 510, a columnar hole 513 extending in the Z-axis direction and configured to rotatably support the screw 520 is formed.

The screw 520 includes a screw part 521 being a male screw, and an operating part 522. The screw part 521 has substantially the same diameter as the hole 513 formed to the supporting member 510 and is rotatably supported on the supporting member 510 by a tip end of the screw part 521 being inserted in the hole 513. The operating part 522 is a nob for operating to make the screw part 521 rotate about an axis thereof.

The coupling part 530 includes an elevating member 531 and a supporting rod coupling member 532. The elevating member 531 is a metal member formed to have a crank shape when viewed in the Y-axis direction. The elevating member 531 includes a screw fitting part 531A extending in the X-axis direction, a vertical part 531B extending downwardly from an end of the screw fitting part 531A in the X-axis direction, and a fixing part 531C extending in the X-axis negative direction from a lower end of the vertical part 531B. The fixing part 531C is formed to have a cross section that is smaller than the opening 432Aa formed to the vertical part 432A of the guide support frame 430A and penetrates through the opening 432Aa.

To the screw fitting part 531A, a female screw 531Aa penetrating in the Z-axis direction is formed near a center of the screw fitting part 531A in the X-axis direction and the Y-axis direction. The screw part 521 fits in the female screw 531Aa. Also, to the screw fitting part 531A, a female screw 531Ab penetrating in the Z-axis direction is formed near an end of the screw fitting part 531A in the X-axis positive direction. An end portion of the fixing part 531C in the X-axis negative direction is fixed to and end portion of the supporting rod coupling member 532 in the X-axis positive direction by a fixing member.

The supporting rod coupling member 532 is a substantially rectangular metal plate disposed horizontally. The supporting rod coupling member 532 is formed to have dimensions in the X-axis direction and the Y-axis direction that are substantially the same as dimensions of the blowing nozzle member 310 in the X-axis direction and the Y-axis direction, respectively.

Near four corners of the substantially rectangular supporting rod coupling member 532, openings 532A in which lower ends of the supporting rods 410 of the guiding unit 400 are to be inserted are formed. The supporting rods 410 inserted in the openings 532A are fixed to the supporting rod coupling member 532 by fixing members 532B. To the supporting rod coupling member 532, a journal clearance opening (not shown) is formed substantially coaxially with the rotation axis of the specimen W so as to avoid contacting with the journal of the specimen W supported by the vibrating unit 200.

A movable direction of the coupling part 530 is restricted to the Z-axis direction by the guiding unit 400. Therefore, when the screw 520 is rotated by operating the operating part 522, the coupling part 530 to which the female screw 531Aa configured to fit with the screw part 521 is formed moves up and down in the Z-axis direction. As the coupling part 530 moves up and down, the four supporting rods 410 synchronously moves up and down, and the drive unit 300 fixed at the upper ends of the supporting rods 410 moves up and down as well. That is, the position of the drive unit 300 in a height direction can be adjusted by operating the operating part 522 of the changing unit 500.

To the screw fitting part 531A, a female screw 531Ac extending in the Y-axis direction from the female screw 531Aa to outside the screw fitting part 531A is formed. A screw part 541 (male screw) of the lock member 540 fits in the female screw 531Ac. The screw part 541 has a length that makes it possible to make a tip of the screw part 541 reach the female screw 531Aa. The rotation of the screw 520 can be prevented by screwing the screw part 541 by rotating an operating part 542 of the lock member 540 until the tip of the screw part 541 reaches the female screw 531Aa.

That is, by providing the changing unit 500, it is made possible to change and fix the position of the drive unit 300 in the Z-axis direction in accordance with the specimens W having different shapes and/or dimensions by simple operations, that is, by rotating the operating part 522 of the screw 520 and the operating part 542 of the lock member 540.

The shifting unit 600 includes an actuator 610 and a stopper part 620. The actuator 610 is a linear actuator elevatably supporting the changing unit 500. In the present embodiment, an air cylinder is used as the actuator 610. To an upper surface of the actuator 610, a columnar hollow part 611 having substantially the same diameter as the small-diameter part 511 of the supporting member 510 of the changing unit 500 and extending in the Z-axis direction is formed. The hollow part 611 is connected to a fluid pressure device configured to supply fluid pressure to the actuator 610. It is made possible to elevate the drive unit 300 via the changing unit 500 by making the small-diameter part 511 inserted in the hollow part 611 to move up and down by the fluid pressure.

The stopper part 620 includes a stopper 621 and a screw part 622 (male screw). The screw part 622 fits with the female screw 531Ab formed to the screw fitting part 531A of the changing unit 500. The stopper part 620 is configured such that a lower end of the screw part 622 abuts the stopper 621 when the drive unit 300 is at a descended position by the actuation of the actuator 610.

The shifting unit 600 is configured to elevate the Z-axis position of the drive unit 300 between a driving position at which the driving unit 300 blows air to the specimen W to rotationally drive the specimen W and a standby position being a position lower than the driving position. By configuring such that the drive unit 300 can be lowered to the standby position being lower than the driving position, replacement work for replacing the specimen W can be facilitated. Furthermore, since the changing unit 500 is configured to be elevated along with the drive unit 300, labor for adjusting the position of the drive unit 300 in the Z-axis direction each time the specimen W is replaced can be eliminated and thus workability and positional accuracy of the drive unit 300 can also be improved.

A height of the standby position can be changed by a length of the screw part 622 protruding from a lower surface of the screw fitting part 531A of the changing unit 500. Therefore, for example, even if the driving position is changed to a higher position, it is possible to keep the height of the standby position at the low position by adjusting a screwing depth of the screw part 622 to the female screw 531Ab. By configuring as above, it becomes possible to prevent deterioration of the workability due to the change of the driving position. Also, as shown in FIGS. 1 and 2, the dynamic balance testing device 1 includes a push up unit 150 configured to lift the position of the specimen W in the Z-axis direction by pushing the journal of the specimen W up from below to facilitate detachment of the specimen W.

It is noted that positional relationship between the guiding unit 400, the changing unit 500 and the shifting unit 600 is not limited to that of the present embodiment provided that the elevating movement of the drive unit 300 by the shifting unit 600 is made between the driving position and the standby position. For example, the positions of the changing unit 500 and the shifting unit 600 may be interchanged. Also, the changing unit 500 (the shifting unit 600) may directly support the drive unit 300 to be able to change (shift) the position of the driving unit 300 in the Z-axis direction, and the shifting unit 600 (the changing unit 500) may shift (change) the positions of the changing unit 500 (the shifting unit 600) and the drive unit 300 in the Z-axis direction via the guiding unit 400. Furthermore, the drive unit 300, the changing unit 500 and the shifting unit 600 may be stacked while placing the drive unit 300 on the top without providing the guiding unit 400.

The above description is directed to an example of embodiments of the present disclosure. The embodiments of the present disclosure are not limited to the above-described embodiment, but are capable of various modifications within the scope of the technical concept expressed by the below-described claims. For example, appropriate combinations of the embodiment and the like as explicitly illustrated in this specification and obvious embodiments may also be included in the embodiments of this application.

In the above-described embodiment, the bearing unit 220 is fixed at the lower end of the base 210 and the specimen W is supported at the upper surface side of the bearing unit 220. However, the bearing unit 220 may be fixed at an upper side of the base 210 and the specimen W may be suspended at a lower surface side of the bearing unit 220 provided that the vibrating unit 200 is configured such that the projection of the center of gravity of the specimen W onto the plane defined by the positions where the horizontal springs 120 are attached to the vibrating unit 200 is positioned near the position where the vertical spring 110 is attached to the vibrating unit 200.

In the above-described embodiment, the specimen is supported by the vibrating unit 200 such that the rotation axis of the specimen W becomes vertical. However, the coordinate axes of the above described embodiment may be rotated about the X-axis to tilt the rotation axis of the specimen W.

The above-described embodiment is targeted to, as the specimen, a rotating body having a journal. However, a dynamic balance testing device adapted to a rotating body of which the rotation axis is a substantially columnar cavity can be configured by forming the radial bearing member 222 to have, in place of the hollow part 222E, a substantially columnar protruding part passing through the opening 223A of the thrust bearing member 223 and protruding upward and by making an outer periphery of the protruding part to be a surface for forming a radial air bearing.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

What is claimed is:

1. A dynamic balance testing device, comprising:
   a vibrating unit configured to rotatably hold a predetermined rotating body as a specimen;
   a first spring configured to elastically support the vibrating unit and restrict displacement of the vibrating unit in a direction parallel to a rotation axis of the predetermined rotating body; and
   at least three second springs configured to elastically support the vibrating unit and restrict displacement of the vibrating unit in a predetermined direction orthogonal to the rotation axis,
   wherein the at least three second springs are respectively attached to the vibrating unit at different positions on a same predetermined plane, and
   wherein the vibrating unit holds the predetermined rotating body such that a projection of a center of gravity of the predetermined rotating body onto the predetermined plane is substantially at the same position as a position where the first spring is attached to the vibrating unit.

2. The dynamic balance testing device according to claim 1,
   wherein the first spring is attached to the vibrating unit at a position substantially equidistant from positions where the at least three second springs are attached to the vibrating unit.

3. The dynamic balance testing device according to claim 1,
   wherein positions where the at least three second springs are attached to the vibrating unit are arranged symmetrically with respect to a plane passing through the rotation axis and the position where the first spring is attached to the vibrating unit.

4. The dynamic balance testing device according to claim 1 comprising four second springs,
   wherein the four second springs are arranged such that a substantially rectangular shape is formed on the predetermined plane with apexes where the second springs are attached to the vibrating unit.

5. The dynamic balance testing device according to claim 1,
   wherein the vibrating unit includes a clearance structure for inserting the first spring.

6. The dynamic balance testing device according to claim 5,
   wherein the clearance structure is a hole, a groove or a notch.

7. The dynamic balance testing device according to claim 1,
   wherein the vibrating unit has:
      a base that includes attaching parts for attaching the first spring and the at least three second springs; and
      a bearing unit fixed to the base and configured to rotatably hold the predetermined rotating body.

8. The dynamic balance testing device according to claim 7 comprising four second springs,
   wherein the four second springs are arranged such that a substantially rectangular shape is formed on the predetermined plane with apexes where the second springs are attached to the vibrating unit,
   wherein the base is a substantially rectangular plate having sides parallel to the rotation axis, and
   wherein the second springs are attached near four respective apexes of the base.

9. The dynamic balance testing device according to claim 8,
   wherein the bearing unit is fixed near one end portion of the base in a direction of the rotation axis.

10. The dynamic balance testing device according to claim 1,
    wherein the vibrating unit has a substantially symmetric shape with respect to a plane including a position at which the first spring is attached and the rotation axis.

11. The dynamic balance testing device according to claim 1,
    wherein the vibrating unit has an opening penetrating in a direction perpendicular to the predetermined plane.

12. A dynamic balance testing device, comprising:
    a vibrating unit configured to rotatably hold a predetermined rotating body as a specimen;
    a first spring configured to elastically support the vibrating unit and restrict displacement of the vibrating unit in a direction parallel to a rotation axis of the predetermined rotating body; and
    at least three second springs configured to elastically support the vibrating unit and restrict displacement of the vibrating unit in a predetermined direction orthogonal to the rotation axis,
    wherein the at least three second springs are attached to the vibrating unit on a same predetermined plane,
    wherein the vibrating unit holds the predetermined rotating body such that a projection of a center of gravity of the predetermined rotating body onto the predetermined plane is substantially at the same position as a position where the first spring is attached to the vibrating unit, and
    wherein the vibrating unit has a substantially symmetric shape with respect to a plane including a position at which the first spring is attached and the rotation axis.

* * * * *